United States Patent [19]

Woo

[11] 4,241,200

[45] Dec. 23, 1980

[54] POLYURETHANE ELECTROCOATING COMPOSITION

[75] Inventor: James T. K. Woo, Medina, Ohio

[73] Assignee: SCM Corporation, New York, N.Y.

[21] Appl. No.: 98,909

[22] Filed: Nov. 30, 1979

[51] Int. Cl.$^3$ .............................................. C08G 18/30
[52] U.S. Cl. ................ 525/455; 204/181 R; 525/456
[58] Field of Search ............................. 525/455, 456; 204/181 R

[56] References Cited

U.S. PATENT DOCUMENTS

| | | | |
|---|---|---|---|
| 3,351,575 | 11/1967 | Gilchrist | 260/19 |
| 3,351,675 | 11/1967 | Gilchrist | 260/22 R |
| 3,362,899 | 1/1968 | Gilchrist | 204/181 |
| 3,575,909 | 4/1971 | Gilchrist | 260/29.2 TN |
| 4,017,556 | 4/1977 | Wang | 525/456 |
| 4,021,505 | 5/1977 | Wang | 525/456 |
| 4,153,776 | 5/1979 | Friedlander et al. | 525/455 |

*Primary Examiner*—Maurice J. Welsh
*Attorney, Agent, or Firm*—Thomas M. Schmitz

[57] ABSTRACT

An improved electrocoating composition can be produced by first reacting an isocyanate terminated prepolymer with a minor amount of peroxide to provide a polyurethane polymer blocked with pendant peroxide groups, and then coreacting acrylic monomers with minor amounts of other ethylenically unsaturated monomers in the presence of the preformed polyurethane-peroxide polymer to provide polyurethane copolymer with said monomers. The resulting polyurethane acrylic block copolymer can contain carboxyl or amine groups for dispersing into a dilute aqueous solution and provide an anodic or cathodic electrocoating composition.

4 Claims, No Drawings

POLYURETHANE ELECTROCOATING COMPOSITION

BACKGROUND OF THE INVENTION

Electrocoating compositions are known and disclosed in Gilchrist patents such as U.S. Pat. Nos. 3,351,675; 3,362,899; 3,575,909; and 3,351,575; and the disclosures thereof are incorporated herein by reference.

Prior art electrocoating compositions ordinarily are based on acrylic polymers or copolymers wherein copolymers typically contain copolymerized polymer units of epoxy, polyester, phenolic, aminoplast resin, or phenolplast resins. These electrocoating compositions, however, lack one or more highly desirable physical integrity properties such as toughness, abrasion resistance, impact resistance, flexibility, chemical resistance, solvent resistance, mar resistance, or good weathering properties.

It now has been found that substantially improved electrocoating compositions can be produced from polyurethane-acrylic copolymers produced by first forming a peroxide terminated polyurethane copolymer, and then coreacting the peroxide-polyurethane copolymer with acrylic monomers to produce a polyurethaneacrylic copolymer. The copolymer can include minor amounts of carboxyl or amine containing monomer so as to render the polymer dispersable in water and provide a dilute electrocoating composition for coating either anode or cathode substrates. The cured electrocoated protective coating particularly exhibits improved toughness, impact resistance, flexibility, chemical resistance, solvent resistance, mar and scratch resistance, good weather resistance, good corrosion resistance, as well as other desirable film integrity properties. These and other advantages will become more apparent by referring to the Detailed Description of the Invention.

SUMMARY OF THE INVENTION

The electrocoating composition comprises a polyurethane-acrylic copolymer preferably produced by reacting a peroxide blocked polyurethane with acrylic monomers to produce a polyurethane-acrylic copolymer. The polyurethane-acrylic copolymer can contain carboxyl or amine groups for dispersing into water to form an electrocoating composition for electrocoating the polymer onto anode or cathode substrates.

DETAILED DESCRIPTION OF THE INVENTION

The process of this invention pertains to providing an aqueous-dispersed electrocoating composition containing an acrylic-polyurethane copolymer. The copolymer is produced by first reacting tertiary alkyl peroxide with a diisocyanate to provide a diperoxide blocked urethane prepolymer which functions as a free radical initiator in a subsequent polymerization of acrylic monomers. The polyurethane acrylic copolymer is suitable for use in an anodic or cathodic electrocoating composition.

The most useful peroxide in this invention is a t-butyl hydroxymethyl peroxide although other hydroperoxides such as t-butyl hydroperoxide and cumene hydroperoxide can also be used. Tertiary-butyl hydroxymethyl peroxides can be produced by reacting molar equivalents of formaldehyde with tertiary-butyl hydroperoxide as shown by Erdy, et al., in J. of Polymer Science, 8, A-1, 763–769 (1970).

Referring next to the isocyanate compound to be reacted and capped with a tertiary alkyl peroxide, the polyisocyanate can be a di- or triisocyanate structurally illustrated as:

wherein R can be the same or different and R can be either aliphatic or aromatic group. Suitable polyisocyanates are prefereably diisocyanates such as 2,4 or 2,6 toluene diisocyanate, phenylene diisocyanate, hexamethylene or tetramethylene diisocyanate, 1,5-naphthalene diisocyanate, ethylene or propylene diisocyanate as well as trimethylene or triphenyl triisocyanate, and similar di- or triisocyanate. The polyisocyanate can be generally selected from the group of aliphatic, cycloaliphatic and aromatic polyisocyanates such as, for example, hexamethylene 1,6-diisocyanate; isophorone diisocyanate, 1,4-dimethyl cyclohexane, diphenylmethane diisocyanate; polymethylene polyphenyl polyisocyanate; and mixtures thereof.

The urethane diperoxide prepolymer is then copolymerized with acrylic ethylenically unsaturated monomers to provide a polyurethane-acrylic copolymer. The urethane diperoxide reacts through the peroxide linkage group wherein each peroxide becomes a free radical initiator which activates the ethylenic double bond whereby the urethane prepolymer free radical reacts with an ethylenic double bond to provide a urethane copolymer. Other activated ethylenic double bonds coreact with other monomer double bonds to provide copolymerized acrylic monomers. The urethane copolymer contains by weight at least about 10% urethane and preferably between 20% and 50% urethane with balance being copolymerized acrylic monomers with minor amounts of other ethylenically unsaturated monomers. The molecular weight of such polymers are preferably between about 3,000 and 50,000. Useful ethylenically unsaturated monomers include, for example, lower alkyl esters of acrylic or methacrylic acid such as methyl-, ethyl-propyl-, butyl-, acrylates or methacrylates, 2-methylhexyl acrylate, n-octyl acrylate, 2-ethylhexyl acrylate, as well as similar methacrylates. Minor amounts of other ethylenic monomers include vinyl aromatic hydrocarbons such as styrene, alpha-methyl styrene, similar alkyl styrene, vinyl toluene, vinyl naphthalene, and divinyl benzene; aliphatic hydrocarbons such as 1,3 butadiene, methyl-2-butadiene, 1,3-peperylene, cyclopentadiene, dicyclopentadiene, 2,3-dimethyl butadiene, and similar conjugated polyolefins; vinyl halides such as vinyl chloride and vinylidene chloride; and vinyl esters such as vinyl acetate. Particularly preferred ethylenically unsaturated monomers include alkyl acrylates and methacrylates with minor amounts of styrene, alpha-methyl styrene, t-butyl styrene, 1,3-butadiene, isoprene, and acrylonitrile.

On a weight basis, the polyurethane-acrylic matrix copolymer can contain between 10% and 90% polyurethane, between 10% and 70% acrylic monomer, and up to 50% other copolymerized ethylenic monomers.

The polyurethane-acrylic polymers can be rendered water soluble by introducing pendant amine groups on the polymer to provide an aqueous electrocoating solution suitable for electrocoating onto a cathode substrate.

Amine groups can be attached to the polymer by reacting free carboxyl groups with an alkyleneimine or substituted alkyleneimine as suggested in U.S. Pat. Nos. 3,679,564 and 3,617,458. The amine group is reacted with at least 1% of an acid salt proton donor to render the polymer positive ionic for electrocoating onto a cathode substrate. Useful solubilizing salts include proton donating acids such as phosphoric, sulfuric, hydrochloric, acetic, formic, lactic, and similar organic or inorganic acids.

In similar manner, polymers containing carboxyl groups can be solubilized in water by neutralizing with amine salts or bases such as KOH or NaOH and further provide an anodic electrocoating composition. Carboxyl groups can be introduced into the polymer by reacting polycarboxylic acids such as maleic, fumaric, acrylic, or methacrylic acid. Preferred carboxylic acids are acrylic or methacrylic acid. The acid number of the polymer should be between about 20 and 200 and preferably, between 40 and 80. At least about 2% solubilizing salt such as KOH or NaOH is preferred.

The polyurethane-acrylic matrix copolymer containing hydroxyls or carboxyls are adapted to be crosslinked with aminoplast resins such as melamine-formaldehyde. Melamine resins can be selected from melamine or melamine derivatives such as methylol melamine or similar alkylated melamine-formaldehyde reactive resins commonly referred to as aminoplast resins. Melamine resins, for instance, can cross-link hydroxyl containing polyurethane-acrylic matrix copolymers when heat cured at temperatures of about 300° F. to 400° F. for about 20 minutes. Ordinarily about 65-70 weight parts of polyurethane-acrylic matrix copolymer mixed with about 25 to 35 weight parts melamine crosslinker to provide a resin mixture containing between about 20% to 40% by weight melamine. Other crosslinkers such as blocked isocyanates, phenolic resins, etc., can also be used.

The polyurethane-acrylic matrix polymer mixed with aminoplast resin can be dispersed in water by adding polymer to a water bath containing the proper solubilizing salt such as proton donor salt for cathodic compositions and amines or bases for anodic compositions. The polymer solids content of the electrocoating bath can be generally between 5% and 25% by weight and preferably, between 5% and 15%. The electrocoating composition can be electrocoated onto a cathode or anode substrate by passing direct electric current between the anode and cathode to electrodeposit a coating onto an anode substrate; whereas, the current is reversed for deposition onto a cathode substrate. The substrates are electrically conductive metal such as iron, steel, aluminum, galvanized steel, zinc, and similar electroconductive materials.

Electrocoating is carried out at a voltage above the threshold voltage of the electrocoating paint composition which is the voltage at which the polymer will electrocoat due to a direct electric current being passed through the electrocoating bath. The maximum tolerable voltage is slightly below the rupture voltage of the paint coating being applied to the substrate, where the rupture voltage is that voltage which causes the paint film already applied to rupture upon continued application of such voltage. The desirable voltage is between 20 and 500 volts and preferably between 50 and 300 volts. The temperature of the electrocoating bath is generally between 15° C. and 50° C. and preferably between 20° C. and 35° C. Agitation is preferred to maintain uniformity of the dilute polymer solution.

The invention and merits of this invention are further explained in the following illustrative examples.

EXAMPLE 1

Tert-butyl hydroxymethyl peroxide was prepared as follows. About 60 grams (0.513 mole) of tert-butyl hydroperoxide is slowly dropped into a 55 gram of formaline solution (37%; 0.67 mole) at room temperature. After the addition is complete, the mixture is stirred overnight (16 hours) at room temperature. The resulting product was vacuum distilled at 8-9 mm of mercury. The boiling point of the product was about 51° C.-53° C. and the yield was about 28 grams.

Isocyanate prepolymer blocked with peroxide was produced as follows. About 8 grams of the tert-butylhydroxymethyl peroxide and 50 grams of Spenkel (from Spencer Kellog Co.) P-49-60CX (an aromatic urethane Mn600, NCO sq. wt. 350) containing 0.07 mole isocyanate functionality plus 0.16 grams of dibutyl acetate were introduced into a reaction vessel. After 4 days of stirring at room temperature, there was still a minor amount of free isocyanate present. About 10 grams of methanol was added to react with the free isocyanate before proceeding further. The resulting product was a urethane diperoxide.

A urethane copolymer was produced by the following: 38 grams of the urethane diperoxide was dissolved in 200 grams of benzene. A monomer mixture of 60 grams styrene, 90 grams of ethyl acrylate, and 30 grams methacrylic acid was dropwise added. The polymerization was conducted under nitrogen and a temperature of about 80° C., and the resulting final copolymer contained approximately 17.4% by weight polyurethane.

EXAMPLE 2

In a manner similar to Example 1, about 400 grams 40% solids (DV-2222) isocyanate (an isocyanate prepolymer, Mn4000, NCO sq. wt. 1300, from Spencer Kellog Co.) was reacted with 20 grams of tert-butyl hydroxymethyl peroxide, 0.4 grams of dibutyl tin acetate, and 0.4 grams of triethylamine were stirred under nitrogen atmosphere in a reaction flask after 4 days. About 10 grams of methanol was added to react with the free isocyanate. The product was a peroxide terminated polyurethane which was then added to 400 grams of benzene. Monomers consisting of 160 grams styrene, 240 grams of ethyl acrylate, and 80 grams of methacrylic acid were added under nitrogen blanket at reaction temperature of about 84° C. The final copolymer contained 25% by weight polyurethane. An electrocoating bath was produced on a weight basis as follows.

| 208 | parts | copolymer |
|---|---|---|
| 46.5 | parts | Cymel 303 (melamine) |
| 24.5 | parts | Methylon resin 75108* |
| 1.7 | parts | Surfynol non-ionic surfactant |
| 10.7 | parts | butyl cellosolve |
| 10.7 | marts | Mineral spirits |
| 21.4 | parts | hexyl cellosolve |
| 33.3 | parts | diisoproplanolamine (85% solution) |

| 384 | parts | deionized water |

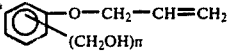

where n = 1-3

Upon electrocoating, a smooth coating with excellent flexibility was obtained.

EXAMPLE 3

Similar to Example 1, a peroxide terminated urethane prepolymer was prepared from 40 grams Spenkel P-49-755 (a urethane prepolymer from Spencer Kellog), 100 grams xylene, 15 grams of t-butyl hydroxymethyl peroxide and 0.2 grams of di-butyl tin dilaurate. The mixture was heated at about 50° C. for about 3 hours. Fifty ml. of butyl cellosolve was added and the reaction mixture was then heated to about 90° C. Thereafter, a monomer mixture of 60 grams styrene, 90 grams ethyl acrylate, and 30 grams methacrylic acid was added to the reaction mixture. The polymer had an Acid No. of 52.3. Excess solvent was removed and sufficient butyl cellosolve was added to provide a solids content of 64.9% by weight. The number average molecular weight was determined to be about 20,000. This resin solution was used to prepare an electrocoating bath solution as follows.

57.8 grams resin
13.9 grams melamine 10,719-28 (from American Cyanamid)
4.5 grams dimethylethanolamine
90.8 grams deionized water The resin and melamine were heated together at 150° F.-160° F. and mixed with preheated (160° F.) deionized water containing the dimethylethanolamine. The resulting mixture was diluted with 833 grams water to provide a 5% polymer solids electrocoating solution. Electrocoating was carried out at 130 volts at 80° F. for 15 seconds to provide an electrocoated film of about 0.21 to 0.26 mils. This primer coating was baked at 540° F. for 45 seconds. The resulting coating withstood 100 MEK rubs with only slight surface effect. A top coat was applied and provided excellent flexibility.

We claim:

1. In a process for electrodeposition of heat-curable electrocoating composition containing a matrix polymer and aminoplast cross-linking compound dispersed into an aqueous electrocoating bath solution, said matrix polymer containing carboxyl or hydroxyl groups for cross-linking with said aminoplast resin upon subsequent heat curing the electrocoating composition, the improvement comprising:

providing as said matrix polymer a polyurethane-acrylic copolymer containing on a weight basis between about 10% and 90% polyurethane, between about 10% and 70% copolymerized acrylic monomers, and 0% to 50% copolymerized ethylenically unsaturated monomers other than said acrylic monomers.

2. The process in claim 1 wherein the polyurethane-acrylic copolymer was synthesized by reacting a peroxide blocked urethane prepolymer with said acrylic monomers and said other ethylenically unsaturated monomers to produce said polyurethane-acrylic copolymer.

3. The process in claim 1 wherein the polyurethane-acrylic copolymer was produced by first reacting a tertiary alkyl peroxide with a diisocyanate or triisocyanate to produce a blocked urethane prepolymer which functions as a peroxide free radical initiator in a second step of copolymerizing the acrylic and other ethylenically unsaturated monomers to produce a polyurethane-acrylic copolymer.

4. The process in claim 3 wherein the peroxide is t-butyl hydroxymethyl peroxide.

* * * * *